United States Patent
Keller et al.

(10) Patent No.: US 10,917,897 B2
(45) Date of Patent: Feb. 9, 2021

(54) CONTROL OF RADIO TECHNOLOGY USAGE BY SCHEDULING RESTRICTION

(71) Applicant: Telefonaktiebolaget LM Ericsson (publ), Stockholm (SE)

(72) Inventors: Ralf Keller, Würselen (DE); Jarl Tomas Holmström, Dalby (SE); Gunnar Rydnell, Gothenburg (SE); Hans Krister Mikael Sällberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/348,526

(22) PCT Filed: Feb. 6, 2017

(86) PCT No.: PCT/EP2017/052540
§ 371 (c)(1),
(2) Date: May 9, 2019

(87) PCT Pub. No.: WO2018/141413
PCT Pub. Date: Aug. 9, 2018

(65) Prior Publication Data
US 2019/0268895 A1    Aug. 29, 2019

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0032* (2013.01); *H04W 48/02* (2013.01);
(Continued)

(58) Field of Classification Search
CPC .... H04L 5/0032; H04W 48/02; H04W 48/04; H04W 72/048; H04W 48/18; H04W 4/02;
(Continued)

(56) References Cited

U.S. PATENT DOCUMENTS 9,402,217 B1 *  7/2016  Khan ................... H04W 36/22
9,867,030 B2    1/2018  Aramoto et al.
(Continued)

FOREIGN PATENT DOCUMENTS

WO    2010150734 A1    12/2010

OTHER PUBLICATIONS

3rd Generation Partnership Project, "3rd Generation Partnership Project; Technical Specification Group Services and System Aspects; Procedures for the 5G System; Stage 2; (Release 15)", Technical Specification, 3GPP TS 23.502 V0.1.1, Jan. 1, 2017, pp. 1-46, 3GPP.

(Continued)

*Primary Examiner* — Jaime M Holliday
(74) *Attorney, Agent, or Firm* — Coats + Bennett, PLLC

(57) ABSTRACT

A node (150) of a wireless communication network controls connectivity of a radio device (10) to the wireless communication network. The connectivity is based on parallel usage of a first radio technology and a second radio technology. Depending on subscription data associated with the radio device (10), the node controls a restriction of scheduling of radio transmissions of the radio device (10) for one of the first radio technology and the second radio technology.

20 Claims, 6 Drawing Sheets

(51) Int. Cl.
*H04W 48/02* (2009.01)
*H04W 48/04* (2009.01)
*H04W 76/16* (2018.01)
*H04W 88/06* (2009.01)
*H04W 48/18* (2009.01)
*H04W 72/12* (2009.01)
*H04W 4/02* (2018.01)

(52) U.S. Cl.
CPC .......... *H04W 48/04* (2013.01); *H04W 76/16* (2018.02); *H04W 4/02* (2013.01); *H04W 48/18* (2013.01); *H04W 72/1215* (2013.01); *H04W 88/06* (2013.01)

(58) Field of Classification Search
CPC .. H04W 72/1215; H04W 76/16; H04W 88/06
See application file for complete search history.

(56) References Cited

U.S. PATENT DOCUMENTS

| | | | |
|---|---|---|---|
| 2015/0119103 A1 | 4/2015 | Ngai et al. | |
| 2016/0057661 A1* | 2/2016 | Nayak | H04W 36/0022 370/331 |
| 2016/0057723 A1 | 2/2016 | Horn et al. | |
| 2016/0057729 A1 | 2/2016 | Horn et al. | |
| 2016/0345190 A1 | 11/2016 | Chen et al. | |
| 2017/0289866 A1* | 10/2017 | Watfa | H04W 36/0033 |

OTHER PUBLICATIONS

3rd Generation Partnership Project, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 14)", Technical Specification, 3GPP TS 29.272 V14.2.0, Dec. 1, 2016, pp. 1-160, 3GPP.

3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 14)", Technical Specification, 3GPP TS 23.401 V14.2.0, Dec. 1, 2016, pp. 1-385, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.1.1, Jan. 1, 2017, pp. 1-67, 3GPP.

3rd Generation Partnership Project, "3rd Generation Partnership Project; Technical Specification Group Services and System Aspects; Architectural Requirements (Release 14)", Technical Specification, 3GPP TS 23.221 V14.1.0, Dec. 1, 2016-12-01, pp. 1-52, 3GPP.

* cited by examiner

| Bit | Description |
|---|---|
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | NR Not Allowed |

CONTROL OF RADIO TECHNOLOGY USAGE BY SCHEDULING RESTRICTION

TECHNICAL FIELD

The present invention relates to methods for controlling radio transmissions in a wireless communication network and to devices and systems.

BACKGROUND

In wireless communication networks, multiple radio technologies may be used for providing access of a radio device, in the following also referred to as "UE" (user equipment) to the wireless communication network. Examples of such radio technologies are the GSM (Global System for Mobile Communications), UMTS (Universal Mobile Telecommunications System), and LTE (Long Term Evolution) technologies specified by 3GPP ($3^{rd}$ Generation Partnership Project). A further example is the NR (New Radio) technology currently developed by 3GPP. Each radio technology defines its own network architecture, typically including a RAN (radio access network) part and a CN (core network) part. In the case of the LTE technology, the CN is referred to as EPC (Evolved Packet Core). In the case of the LTE technology, the CN is also referred to as NGCN (Next Generation CN) or 5GCN ($5^{th}$ Generation CN).

In order to migrate from the LTE technology to the NR technology, it is discussed to allow usage of the LTE RAT (radio access technology) together with the 5G ($5^{th}$ Generation) CN or usage of the NR RAT together with the EPC, as for example explained in section 5.17.1 of 3GPP TS 23.501 V0.1.1 (2017-01). In some cases, the LTE RAT and the NR RAT may also be used in parallel for access via the EPC or 5G CN. The latter scenario is also referred to as dual connectivity.

However, in scenarios where two different radio technologies are supported for accessing the same CN, there may be problems concerning the handling of access restrictions. Specifically, access restriction procedures as for example described in 3GPP TS 23.221 V14.1.0 (2016-12), where access using a certain radio technology is either rejected or admitted, may provide unsatisfactory results. For example, in scenarios where parallel usage of the LTE RAT and the NR RAT is supported to enhance data performance of a UE, the operator may wish to allow utilization of this feature for only some subscribers, while for other subscribers access should not be completely rejected.

Accordingly, there is a need for techniques which allow for efficiently addressing situations in which a radio device uses two radio technologies in parallel to access a wireless communication network.

SUMMARY

According to an embodiment of the invention, a method of controlling radio transmissions in a wireless communication network is provided. According to the method, a node of the wireless communication network controls connectivity of a radio device to the wireless communication network. The connectivity is based on parallel usage of a first radio technology and a second radio technology. Depending on subscription data associated with the radio device, the node controls a restriction of scheduling of radio transmissions of the radio device for one of the first radio technology and the second radio technology.

According to a further embodiment of the invention, a method of controlling radio transmissions in a wireless communication network is provided. According to the method, an access node of the wireless communication network schedules radio transmissions of a radio device for at least one of a first radio technology and a second radio technology. The radio device has connectivity based on parallel usage of the first radio technology and the second radio technology. The access node receives control information. Depending on the control information, the access node controls a restriction of said scheduling of radio transmissions of the radio device for one of the first radio technology and the second radio technology.

According to a further embodiment of the invention, a node for a wireless communication network is provided. The node is configured to control connectivity of a radio device to the wireless communication network. The connectivity is based on parallel usage of a first radio technology and a second radio technology. Further, the node is configured to, depending on subscription data associated with the radio device, control a restriction of scheduling of radio transmissions of the radio device for one of the first radio technology and the second radio technology.

According to a further embodiment of the invention, an access node for a wireless communication network is provided. The access node is configured to, for at least one of a first radio technology and a second radio technology, schedule radio transmissions of a radio device having connectivity based on parallel usage of the first radio technology and the second radio technology. Further, the access node is configured to receive control information. Further, the access node is configured to, depending on the control information, control a restriction of said scheduling of radio transmissions of the radio device for one of the first radio technology and the second radio technology.

According to a further embodiment of the invention, a computer program or computer program product is provided, e.g., in the form of a non-transitory storage medium, which comprises program code to be executed by at least one processor of a node of a wireless communication network. Execution of the program code causes the node to control connectivity of a radio device to the wireless communication network. The connectivity is based on parallel usage of a first radio technology and a second radio technology. Further, execution of the program code causes the node to, depending on subscription data associated with the radio device, control a restriction of scheduling of radio transmissions of the radio device for one of the first radio technology and the second radio technology.

According to a further embodiment of the invention, a computer program or computer program product is provided, e.g., in the form of a non-transitory storage medium, which comprises program code to be executed by at least one processor of an access node of a wireless communication network. Execution of the program code causes the access node to, for at least one of a first radio technology and a second radio technology, schedule radio transmissions of a radio device having connectivity based on parallel usage of the first radio technology and the second radio technology. Further, execution of the program code causes the access node to receive control information. Further, execution of the program code causes the access node to, depending on the control information, control a restriction of said scheduling of radio transmissions of the radio device for one of the first radio technology and the second radio technology.

Details of such embodiments and further embodiments will be apparent from the following detailed description of embodiments.

DETAILED DESCRIPTION OF EMBODIMENTS

Figure 1:
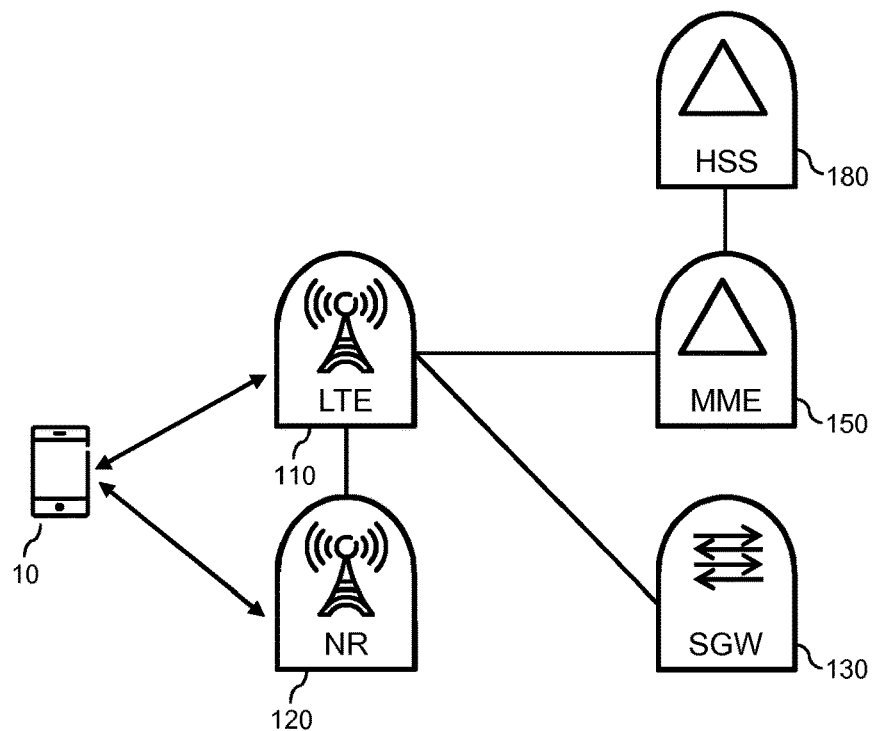
FIG. 1 schematically illustrates a scenario in which radio transmissions are controlled according to an embodiment of the invention.

In the following, concepts according to embodiments of the invention will be explained in more detail by referring to the accompanying drawings. The illustrated concepts relate to control of radio transmissions in a wireless communication network. Specifically, the concepts relate to scenarios where connectivity of a radio device to the wireless communication network is based on parallel usage of two radio technologies. The radio device may correspond to various types of UE, such as a mobile phone, a tablet computer, a portable or stationary personal computer, a multimedia or gaming device, a machine-to-machine communication device, or the like. In the more specific examples illustrated below, it is assumed that the two radio technologies correspond to the LTE RAT and the NR RAT and the LTE RAT and NR RAT are used either to access the LTE CN (also referred to as EPC), or the 5G CN (also referred to as NGCN). However, it is to be understood that the illustrated concepts may also be applied to any other scenario where a first radio technology and a second radio technology are used in parallel to access a CN of either the first radio technology or the second radio technology. Moreover, it is to be understood that the illustrated concepts may also be applied to scenarios where connectivity of the UE is based on parallel usage of more than two radio technologies.

In the concepts as illustrated in the following, the connectivity based on the two radio technologies supports restriction of one of these radio technologies. Based on subscription data for the UE, a node of the wireless communication network, typically a CN node, decides whether to activate or to deactivate the restriction. The restriction is then applied in the RAN by adapting scheduling for the radio technology to be restricted. As used herein, the term "scheduling" is intended to cover various ways of controlling allocation of radio resources for radio transmissions, e.g., by configuring or reserving radio resources for a radio channel and/or by dynamically allocating radio resources for individual radio transmissions. The restriction of scheduling may specifically concern radio transmissions of user plane data. On the other hand, scheduling of at least some control plane data may be admitted irrespective of the restriction. For example, scheduling of control plane data relating to management of mobility of the UE within the wireless communication network or scheduling of control plane data relating to registration or attachment of the UE to the wireless communication network may be admitted irrespective of the restriction. In addition to the subscription data, the decision whether to activate or deactivate the restriction may also depend on other criteria. For example, the decision may also depend on a location of the UE within a coverage area of the wireless communication network, e.g., a location represented in terms of a tracking area (TA) where the UE is currently assumed to be located. The CN node could then apply local policies to decide depending on the TA whether the restriction should be activated or not.

FIG. 1 schematically illustrates a scenario in which the concepts as outlined above may be applied. The scenario of FIG. 1 assumes that a UE 10 has dual connectivity based on the LTE RAT and the NR RAT, and that the UE 10 is connected to the EPC via an LTE access node 110, also referred to as eNB (evolved Node B) and an NR access node 120. It is noted that the eNB 110 and the NR access node 120 may also be combined in one exes node supporting those the LTE RAT and the NR RAT. Further, FIG. 1 illustrates nodes of the EPC, specifically an SGW (Serving Gateway) 130, an MME (Mobility Management Entity) 150, and an HSS (Home Subscriber Server) 180. The SGW 130 is responsible for conveying user plane data to or from the UE 10. The MME 150 is responsible for managing access of the UE 10 to the wireless communication network, e.g., by controlling attachment of the UE 10 to the wireless communication network, and for managing mobility of the UE 10 within the wireless communication network, e.g., by controlling handovers between different access nodes. The HSS 180 is a subscriber data base which stores and manages subscription data of users of the wireless communication network.

Based on the dual connectivity, the UE 10 may benefit from enhanced data performance by simultaneously conveying user plane data and control plane data by the LTE RAT and the NR RAT. In the case of the NR RAT, the data from the EPC to the UE 10 would be forwarded by the eNB 110 to the NR access node 120 and then transmitted by the NR RAT to the UE 10. Similarly, the data from the UE 10 would be forwarded by the NR access node 120 to the eNB 120 and then to the EPC. Further, control plane data may also be locally exchanged via the LTE RAT between the eNB 110 and the UE 10 or via the NR RAT between the NR access node 120 and the UE 10.

As mentioned above, based on the subscription data associated with the UE 10, the MME 150 may decide to restrict usage of the NR RAT for the UE 10. For example, the user of the UE 10 might have a subscription which excludes NR data usage and the subscription data for the UE 10 may thus indicate that NR is not allowed. The MME 150 may obtain the subscription data for the UE 10 from the HSS 180 and, based on the indication that NR is not allowed, decide to activate the restriction of scheduling for the NR RAT. By sending control information to the eNB 110, the MME 150 may indicate activation of the restriction to the eNB 110, and the eNB 110 may then indicate activation of the restriction to the NR access node 120. The NR access node 120 will then apply the restriction by restricting the scheduling of radio transmissions of the UE 10. This may for example involve applying a corresponding RRC configuration for the NR radio link between the UE 10 and the NR access node 120, so that for the NR RAT no radio resources are allocated for user plane radio transmissions of the UE 10. Nonetheless, control plane radio transmissions based on the NR RAT may still be possible, e.g., for the purpose of supporting mobility procedures, attachment procedures, or registration procedures for the UE 10.

Figure 2:
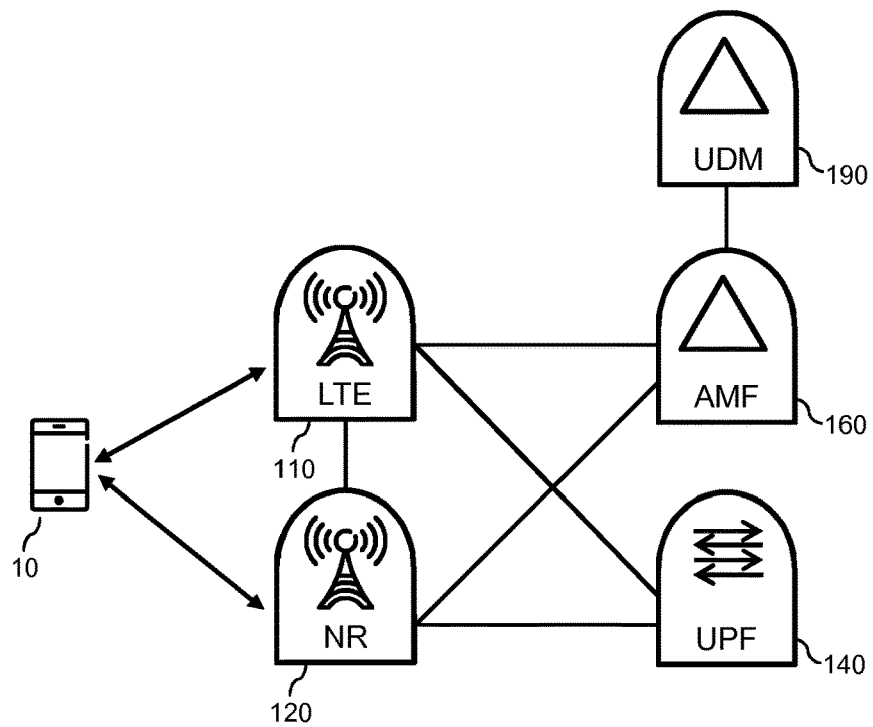
FIG. 2 schematically illustrates a further scenario in which radio transmissions are controlled according to an embodiment of the invention.

FIG. 2 schematically illustrates a further scenario in which the concepts as outlined above may be applied. The scenario of FIG. 2 assumes that a UE 10 has dual connectivity based on the LTE RAT and the NR RAT, and that the UE 10 is connected to the 5G CN via an eNB 110 and an NR access node 120. It is noted that the eNB 110 and the NR access node 120 may also be combined in one exes node supporting those the LTE RAT and the NR RAT. Further, FIG. 2 illustrates nodes of the 5G CN, specifically a UPF (User Plane Function) 140, an AMF (Access and Mobility Management Function) 160, and a UDM (Unified Data Management) 190. The UPF 140 is responsible for conveying user plane data to or from the UE 10. The AMF 160 is responsible for managing access of the UE 10 to the wireless communication network, e.g., by controlling attachment of the UE 10 to the wireless communication network, and for managing mobility of the UE 10 within the wireless communication network, e.g., by controlling handovers between different access nodes. The UDM 190 is a subscriber data base which stores and manages subscription data of users of the wireless communication network.

Based on the dual connectivity, the UE 10 may benefit from enhanced data performance by simultaneously conveying user plane data and control plane data by the LTE RAT and the NR RAT. In the case of the LTE RAT, the data from the 5G CN to the UE 10 may be forwarded by the NR access node 120 to the eNB 110 and then transmitted by the LTE RAT to the UE 10. Similarly, the data from the UE 10 may be forwarded by the eNB 110 to the NR access node 120 and then to the NR RAT. However, the 5G CN may also support direct interfaces to the eNB 110. FIG. 2 illustrates such direct interface between the eNB 110 and the UPF 140 and between the eNB 110 and the AMF 160. Using these interfaces the eNB 110 may forward data received by the LTE RAT to the 5G CN or receive data to be transmitted by the LTE RAT from the 5G CN. Further, control plane data may also be locally exchanged via the LTE RAT between the eNB 110 and the UE 10 or via the NR RAT between the NR access node 120 and the UE 10.

As mentioned above, based on the subscription data associated with the UE 10, the AMF 160 may decide to restrict usage of the NR RAT for the UE 10. For example, the user of the UE 10 might have a subscription which excludes NR data usage and the subscription data for the UE 10 may thus indicate that NR is not allowed. The AMF 160 may obtain the subscription data for the UE 10 from the UDM 190 and, based on the indication that NR is not allowed, decide to activate the restriction of scheduling for the NR RAT. By sending control information to the NR access node 120, the AMF 160 may indicate activation of the restriction to the NR access node 120. The NR access node 120 will then apply the restriction by restricting the scheduling of radio transmissions of the UE 10. This may for example involve applying a corresponding RRC configuration for the NR radio link between the UE 10 and the NR access node 120, so that for the NR RAT no radio resources are allocated for user plane radio transmissions of the UE 10. Nonetheless, control plane radio transmissions based on the NR RAT may still be possible, e.g., for the purpose of supporting mobility procedures, attachment procedures, or registration procedures for the UE 10.

Figure 3:
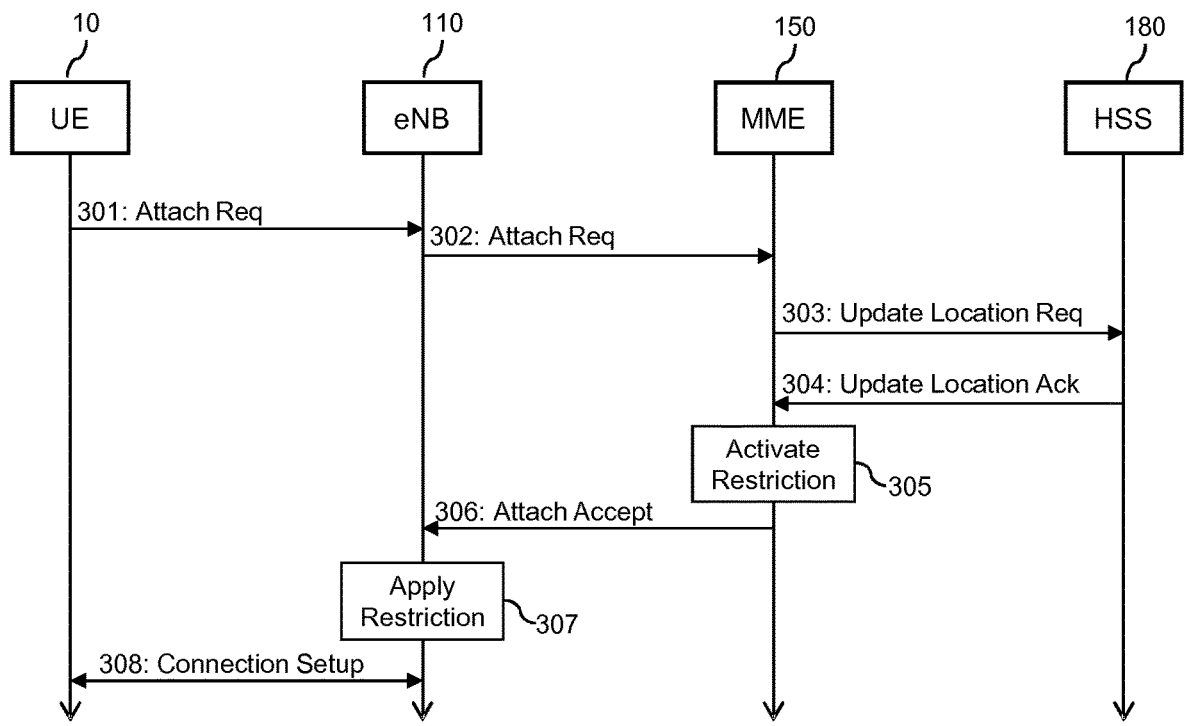
FIG. 3 schematically illustrates an example of processes according to an embodiment of the invention.

FIG. 3 illustrates exemplary processes which are based on the above-described concepts. The processes of FIG. 3 may be used for performing initial attachment and registration of the UE 10 in a scenario as illustrated in FIG. 1. The processes of FIG. 3 are based on an attach procedure as defined in 3GPP TS 23.401 V14.2.0 (2016-12), section 5.3.2.1, and further details of the illustrated processes may be found in this document. The processes of FIG. 3 may for example be performed when the UE 10 initially attaches to the wireless communication network, when the UE 10 changes to a new TA in idle mode, or when the UE 10 needs to update its network status after a period of inactivity.

In the processes of FIG. 3, it is assumed that the UE 10 needs to register with the wireless communication network and thus initiates an attach procedure. As illustrated, the UE 10 initiates the attach procedure by sending an attach request 301 to the eNB 110. Due to the supported dual connectivity, the attach request 301 may be sent by the LTE RAT or by the NR RAT. Otherwise, the attach request 301 and its handling may be as explained in connection with step 1 in the attach procedure of 3GPP TS 23.401 V14.2.0, section 5.3.2.1.

Upon receiving the attach request 301, the eNB 110 selects the MME 150 and forwards the attach request 301 by message 302 to the MME 150. The message 302 and its handling may be as explained in connection with the S1-MME control message of step 2 in the attach procedure of 3GPP TS 23.401 V14.2.0, section 5.3.2.1.

The MME 150 may then proceed by performing an update location procedure with the HSS 180. As illustrated, this involves that the MME 150 sends an update location request 303 to the HSS 180, and that the HSS 180 responds with an update location acknowledgment 304 to the MME 150. The update location request 303 and its handling may be as explained in connection with step 8 in the attach procedure of 3GPP TS 23.401 V14.2.0, section 5.3.2.1. The update location acknowledgement 304 includes subscription data for the UE 10. The subscription data indicate whether NR is allowed for the concerned subscriber. Further, the subscription data may also indicate for this subscriber whether the MME 150 is allowed to restrict utilization of the NR RAT based on local policy. Otherwise, the update location acknowledgement 304 and its handling may be as explained in connection with step 11 in the attach procedure of 3GPP TS 23.401 V14.2.0, section 5.3.2.1.

In the example of FIG. 3, it is assumed that the received subscription data indicate that NR is not allowed. The MME 150 thus decides based on the received subscription data to activate the restriction of scheduling for the NR RAT, as illustrated by block 305. Here, it is noted that the MME 150 may also consider other criteria when deciding whether to activate the restriction of scheduling for the NR RAT. For example, such other criteria could be defined by local policies configured in the MME 150 and depend on the location of the UE 10, e.g., on the TA where the UE 10 is currently located.

The MME 150 then sends control information indicating the activation of the restriction to the eNB 110. In the processes of FIG. 3, this is accomplished by sending an attach accept message 306 to the eNB 110. For this purpose, the attach accept message 305 may indicate whether NR is allowed for the concerned subscriber. Otherwise, the attach accept message 306 and its handling may be as explained in connection with step 17 in the attach procedure of 3GPP TS 23.401 V14.2.0, section 5.3.2.1.

In accordance with the decision of block 306, the attach accept message 305 would in the present example indicate the NR is not allowed. It is noted that while in the present example both the update location acknowledgement 304 and the attach accept message 306 indicate that NR is not allowed, there may also be scenarios where the indication whether NR is allowed differs between these two messages. For example, in some scenarios the subscription data in the update location acknowledgement 304 could indicate that NR is allowed, but the MME 150 could nonetheless decide based on local policy to activate the restriction.

On the basis of the control information received with the attach accept message 306, the eNB 110 will then apply the restriction, as illustrated by 307. When the eNB 110 and the NR access node 120 are separate nodes, as illustrated in FIG. 1, this may involve that the eNB 110 instructs the NR access node 120 to apply the restriction of scheduling. If the NR RAT is supported directly by the eNB 110, the eNB 110 itself may apply the restriction of scheduling.

As further illustrated by 308, the eNB 110 may setup a radio connection based on the LTE RAT and the NR RAT. This may involve performing various RRC (Radio Resource Control) procedures taking into account the activated restriction of scheduling. In these procedures, the UE 10 may be informed about the restriction of scheduling. When the eNB 110 and the NR access node 120 are separate nodes, as illustrated in FIG. 1, this may involve that the eNB 110 controls RRC procedures performed by the NR access node 120 taking into account the activated restriction of scheduling. In some scenarios, the restriction may also have the effect that no RRC connection is established for the NR RAT.

Figure 4:
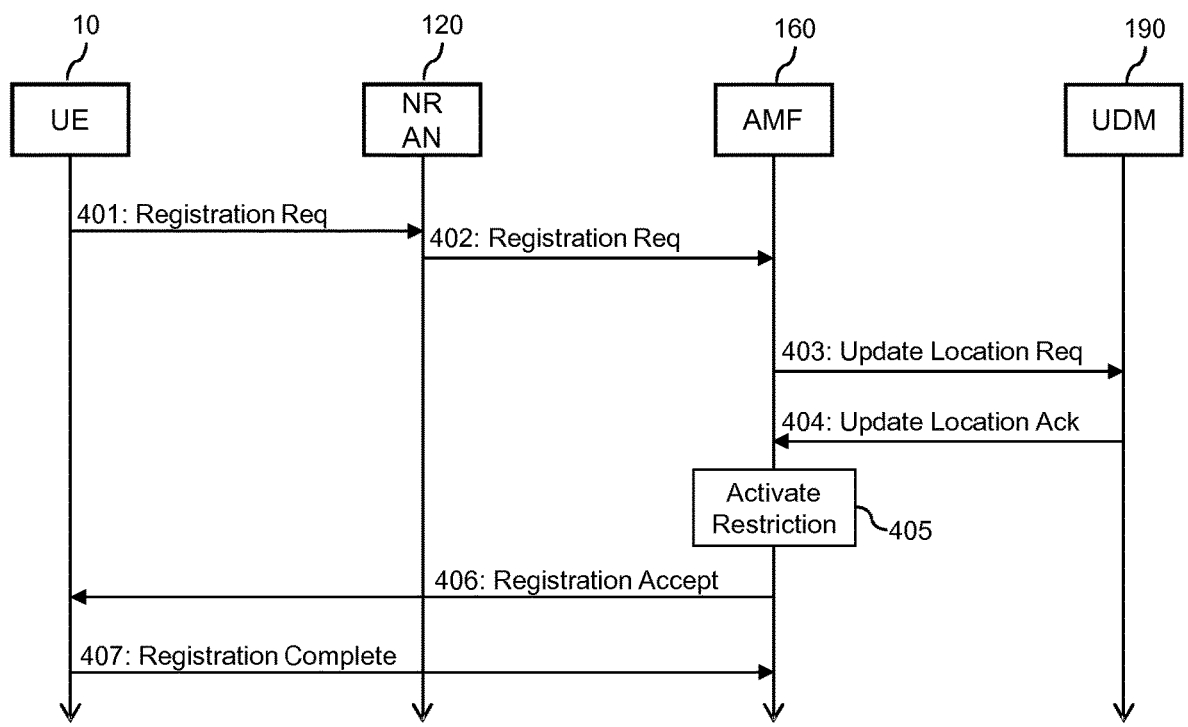
FIG. 4 schematically illustrates a further example of processes according to an embodiment of the invention.

FIG. 4 illustrates exemplary processes which are based on the above-described concepts. The processes of FIG. 4 may be used for performing registration of the UE 10 in a scenario as illustrated in FIG. 2. The processes of FIG. 4 are based on a registration procedure as described in 3GPP TS 23.502 V0.1.1 (2017-01), section 4.2.2.2.2, and further details of the illustrated processes may be found in this document. The processes of FIG. 4 may for example be performed when the UE 10 initially attaches to the wireless communication network, when the UE 10 changes to a new TA in idle mode, or when the UE 10 needs to update its network status after a period of inactivity.

In the processes of FIG. 4, it is assumed that the UE 10 needs to register with the wireless communication network and thus initiates a registration procedure. As illustrated, the UE 10 initiates the registration procedure by sending a registration request 401 to the NR access node (NR AN) 120. The registration request 401 and its handling may be as explained in connection with step 1 in the registration procedure of 3GPP TS 23.502 V0.1.1, section 4.2.2.2.2.

Upon receiving the registration request 401, the NR access node 120 selects the AMF 160 and forwards the attach request 401 by message 402 to the AMF 150. The message 402 and its handling may be as explained in connection with step 3 in the registration procedure of 3GPP TS 23.502 V0.1.1, section 4.2.2.2.2.

The AMF 160 may then proceed by performing an update location procedure with the UDM 190. As illustrated, this involves that the AMF 160 sends an update location request 403 to the UDM 190, and that the UDM 190 responds with an update location acknowledgment 404 to the AMF 160. The update location procedure may be as explained in connection with step 13 in the registration procedure of 3GPP TS 23.502 V0.1.1, section 4.2.2.2.2. The update location acknowledgement 404 includes subscription data for the UE 10. The subscription data indicate whether NR is allowed for the concerned subscriber. Further, the subscription data may also indicate for this subscriber whether the AMF 160 is allowed to restrict utilization of the NR RAT based on local policy.

In the example of FIG. 4, it is assumed that the received subscription data indicate that NR is not allowed. The AMF 160 thus decides based on the received subscription data to activate the restriction of scheduling for the NR RAT, as illustrated by block 405. Here, it is noted that the AMF 160 may also consider other criteria when deciding whether to activate the restriction of scheduling for the NR RAT. For example, such other criteria could be defined by local policies configured in the AMF 160 and depend on the location of the UE 10, e.g., on the TA where the UE 10 is currently located.

The AMF 160 then sends a registration accept message 406 to the UE 10, and the UE 10 confirms completion of the registration by sending a registration complete message 407 to the AMF 160. By the registration accept message 406, the AMF 160 may also inform the UE 10 about the restriction of scheduling. Otherwise, the registration accept message 406 and the registration complete message 407 and their handling may be as explained in connection with steps 21 and 22 in 3GPP TS 23.502 V0.1.1, section 4.2.2.2.2.

Figures 5, 6:
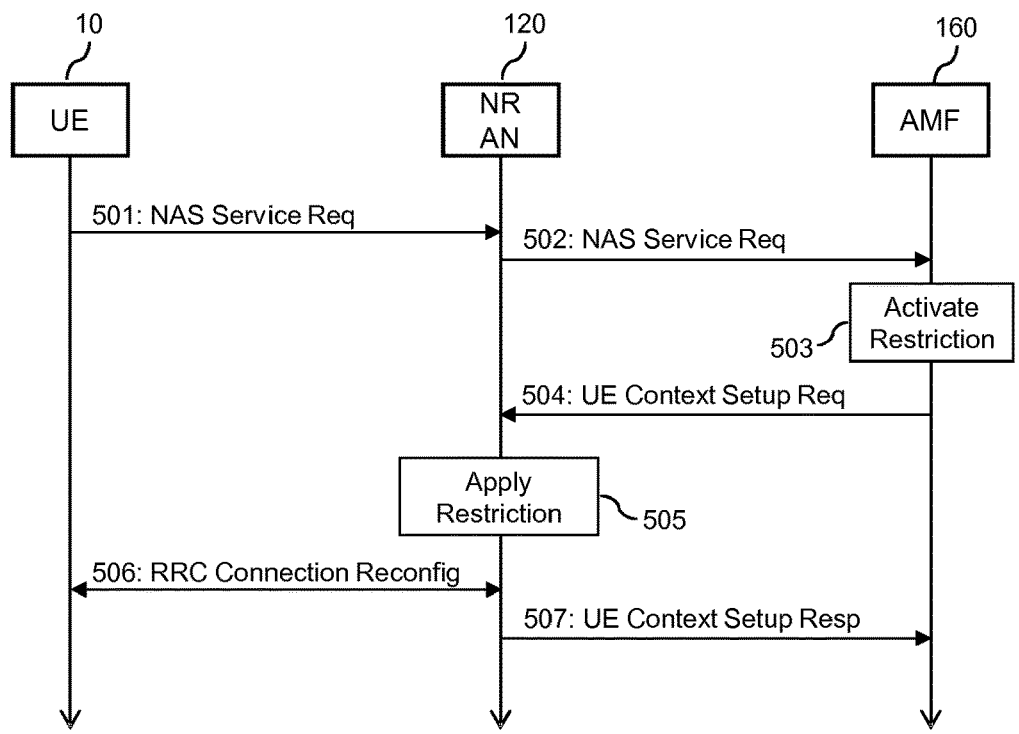
FIG. 5 schematically illustrates a further example of processes according to an embodiment of the invention.
FIG. 6 schematically illustrates subscription information as used according to an embodiment of the invention.

FIG. 5 illustrates exemplary processes which are based on the above-described concepts. The processes of FIG. 5 may be used in a scenario as illustrated in FIG. 2 for establishing a secure connection between the UE 10 and the AMF 160. The processes of FIG. 5 are based on a service request procedure as described in 3GPP TS 23.502 V0.1.1, section 4.2.3.2, and further details of the illustrated processes may be found in this document. The processes of FIG. 5 may for example be performed when the UE 10 is in idle mode and needs to send user plane data and/or control plane data. In the example of FIG. 5, it is assumed that the UE 10 has already registered in the wireless communication network, e.g., by performing the processes of FIG. 4.

In the processes of FIG. 5, the UE 10 initiates establishment of the secure connection between the UE 10 and the AMF 160 by sending a service request 501 to the NR AN 120. The service request is a NAS (Non Access Stratum) message and is forwarded by message 502 to the AMF 160. The service request 501 and the message 502 and their handling may be as explained in connection with steps 1 and 2 in 3GPP TS 23.502 V0.1.1, section 4.2.3.2.

As further illustrated by block 503, the AMF 160 activates the restriction of scheduling. This may be accomplished based on previously received subscription data, e.g., as explained in connection with the processes of FIG. 4. In the example of FIG. 5, it is assumed that the subscription data indicate that NR is not allowed. The AMF 160 thus decides based on the received subscription data to activate the restriction of scheduling for the NR RAT. Here, it is noted that the AMF 160 may also consider other criteria when deciding whether to activate the restriction of scheduling for the NR RAT. For example, such other criteria could be defined by local policies configured in the AMF 160 and depend on the location of the UE 10, e.g., on the TA where the UE 10 is currently located.

The AMF 160 then sends control information indicating the activation of the restriction to the NR AN 120. In the processes of FIG. 5, this is accomplished by sending a context setup request 504 to the NR AN 120. For this purpose, the context setup request 504 may indicate whether NR is allowed for the concerned subscriber. Otherwise, the context setup request 504 and its handling may be as explained for the N2 request in connection with step 5 in the attach procedure of 3GPP TS 23.502 V0.1.1, section 4.2.3.2.

In accordance with the decision of block 503, the context setup request 504 would in the present example indicate the NR is not allowed. It is noted that while in the present example both the subscription data and the context setup request 504 indicate that NR is not allowed, the may also be scenarios where the indication whether NR is allowed as provided in the context setup request 504 differs from the indication in the subscription data. For example, in some scenarios the subscription data could indicate that NR is allowed, but the AMF 160 could nonetheless decide based on local policy to activate the restriction.

On the basis of the control information received with the context setup request 504, the NR AN 120 will then apply the restriction, as illustrated by 505. This may involve reconfiguration of an RRC connection between the NR AN 120 and the UE 10, as illustrated by RRC connection reconfiguration procedure 506. In the RRC connection reconfiguration procedure 506, the activated restriction of scheduling the UE 10 is applied, e.g., by not configuring or reserving radio resources for transmissions of user plane data. Further, the RRC connection reconfiguration procedure 506 may also be used to inform the UE 10 about the restriction of scheduling. In some scenarios, the restriction may also have the effect that no RRC connection is established for the NR RAT or that an existing RRC connection for the NR RAT is released.

It is to be understood that while in the examples as described above the scheduling was restricted for the NR RAT, similar processes could also be used for restricting the scheduling for the LTE RAT.

FIG. 6 schematically illustrates a data element 600 which may be used in the concepts as illustrated herein. For example, the data element of FIG. 6 could be stored in a subscriber data record for the UE 10 as maintained in a subscriber data base, such as the HSS 180 or the UDM 190, or a subscriber database combining functionalities of the HSS 180 and the UDM 190. The data element 600 of FIG. 6 may be transmitted in an attribute value pair (AVP), e.g., in the update location acknowledgement 304, in the attach accept message 306, in a message of the connection setup procedure 308, in the update location acknowledgement 404, in the registration accept message 406, in the UE context setup message 504, or in a message of the RRC connection reconfiguration procedure 506.

As illustrated, the data element 600 is organized as a multibit value. Each bit of the value is assigned to a certain radio technology or access variant, and setting a certain bit indicates that the corresponding radio technology or access variant is not allowed for the subscriber. Similar to the Access-Restriction-Data AVP described in 3GPP TS 29.272 V14.2.0 (2016-12), the bits 0 to 6 relate to the following radio technologies and access variants: UTRAN (UMTS Terrestrial Radio Access Network), GERAN (GSM EDGE Radio Access Network), GAN (Generic Access Network), I-HSPA-Evolution (Internet High Speed Packet Access Evolution), WB-E-UTRAN (Wideband Evolved UTRAN), HO-To-Non-3GPP-Access (Handover to non-3GPP access), NB-IoT (Narrowband Internet of Things). In addition, bit 7 relates to the NR RAT. In the examples as explained above, bit 7 of the data element 600 would be used to indicate whether the restriction of scheduling should be activated for the NR RAT. Bit 4 could be used to indicate the restriction of scheduling should be activated for the NR RAT.

Figure 7:
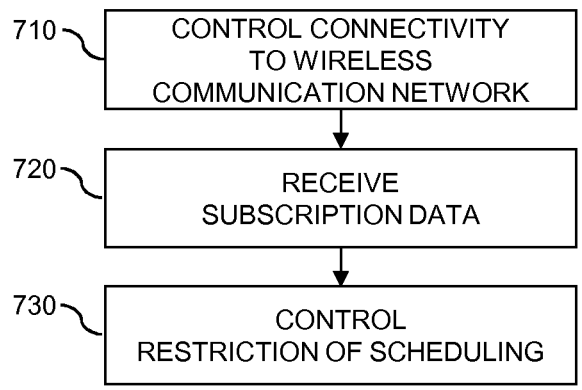
FIG. 7 shows a flowchart for illustrating a method of controlling radio transmissions according to an embodiment of the invention.

FIG. 7 shows a flowchart for illustrating a method of controlling radio transmissions in a wireless communication network. The method of FIG. 7 may be utilized for implementing the illustrated concepts in a node of the wireless communication network, in particular a node which is responsible for managing access and mobility in the wireless communication network, such as the above-mentioned MME 150 or AMF 160. If a processor-based implementation of the node is used, the steps of the method may be performed by one or more processors of the node. In such a case the node may further comprise a memory in which program code for implementing the below described functionalities is stored.

At step 710, the node controls connectivity of a radio device, such as the above-mentioned UE 10, to the wireless communication network. The connectivity is based on parallel usage of a first radio technology and a second radio technology. In some scenarios, the first radio technology is an LTE RAT and the second radio technology is an NR RAT. However, it is noted that other combinations of radio technologies could be considered as well. The controlling of connectivity may for example involve management of access of the radio device to the wireless communication network, e.g., by performing a registration procedure with the radio device, or management of mobility of the radio device within the wireless communication network, e.g., by controlling a handover of the radio device between different access nodes of the wireless communication network.

At step 720, the node may receive subscription data associated with the radio device. For example, the node may receive the subscription data from a subscriber database, such as the above-mentioned HSS 180 or UDM 190. The subscription data for example be received in a data element as illustrated in FIG. 6.

At step 730, the node controls a restriction of scheduling of radio transmissions of the radio device for one of the first radio technology and the second radio technology. For example, the restriction may affect an allocation or reservation of radio resources for the radio transmissions. The node controls the restriction depending on subscription data associated with the radio device, for example as received at step 720.

The restriction of scheduling may block scheduling of radio transmissions with user plane data. In some scenarios, the restriction of scheduling may block scheduling of radio transmissions with user plane data, while admitting scheduling of radio transmissions with control plane data, such as control plane data relating to mobility management of the radio device or control plane data relating to registration of the radio device in the wireless communication network.

In response to the subscription data indicating that one of the first radio technology and the second radio technology is not allowed, the node may activate the restriction of scheduling for this radio technology. In response to the subscription data indicating that one of the first radio technology and the second radio technology is allowed, the node may deactivate the restriction of scheduling for this radio technology.

In some scenarios, the decision whether to activate or deactivate the restriction may depend on one or more additional criteria, e.g., as defined by a local policy configured in the node. For example, the node may control the restriction further depending on a location of the radio device within a coverage area of the wireless communication network. The location could for example be represented in terms of a certain sub-area within a coverage area of the wireless communication network, such as a TA, routing area (RA), or location area (LA).

The node may control the restriction of scheduling by sending control information to an access node which is responsible for said scheduling of radio transmissions of the radio device, such as one of the above-mentioned access nodes 110, 120. Accordingly, the restriction may be applied within a RAN part of the wireless communication network. The control information may be subscriber-specific.

Figure 8:
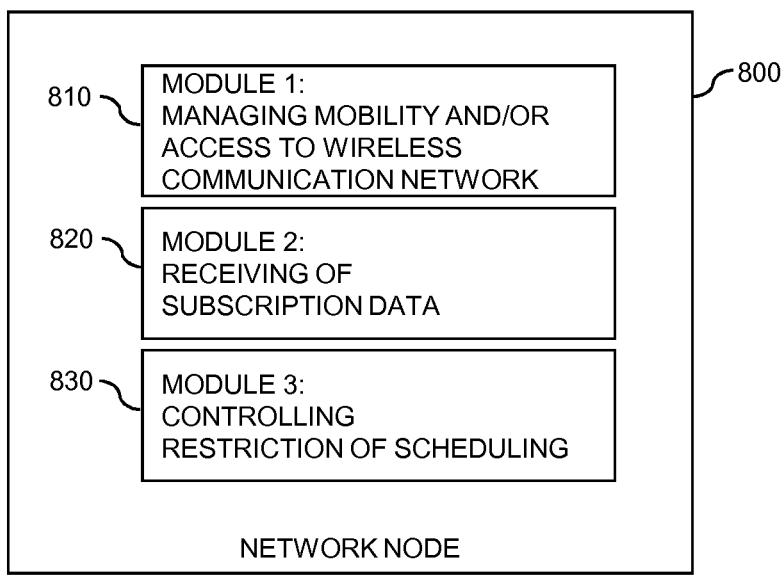
FIG. 8 shows a block diagram for illustrating functionalities of a network node according to an embodiment of the invention.

FIG. 8 shows a block diagram for illustrating functionalities of a network node 800 which operates according to the method of FIG. 7. As illustrated, the network node 800 may optionally be provided with a module 810 configured to control connectivity of a radio device, such as explained in connection with step 710. Further, the network node 800 may be provided with a module 820 configured to receive subscription data, such as explained in connection with step 720. Further, the network node 800 may be provided with a module 830 configured to control a restriction of scheduling, such as explained in connection with step 730.

It is noted that the network node 800 may include further modules for implementing other functionalities, such as known functionalities of an MME or AMF. Further, it is noted that the modules of the network node 800 do not necessarily represent a hardware structure of the network node 800, but may also correspond to functional elements, e.g., implemented by hardware, software, or a combination thereof.

Figure 9:
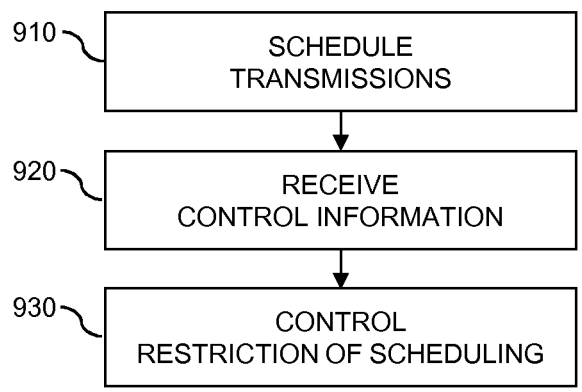
FIG. 9 shows a flowchart for illustrating a further method of controlling radio transmissions according to an embodiment of the invention.

FIG. 9 shows a flowchart for illustrating a method of controlling radio transmissions in a wireless communication network. The method of FIG. 9 may be utilized for implementing the illustrated concepts in an access node of the wireless communication network, such as one of the above-mentioned access nodes 110, 120. If a processor-based implementation of the node is used, the steps of the method may be performed by one or more processors of the access node. In such a case the access node may further comprise a memory in which program code for implementing the below described functionalities is stored.

At step 910, the access node schedules radio transmissions of a radio device. The radio device is assumed to have connectivity based on parallel usage of a first radio technology and a second radio technology. In some scenarios, the first radio technology is an LTE RAT and the second radio technology is an NR RAT. However, it is noted that other combinations of radio technologies could be considered as well. The access node schedules radio transmissions for at least one of a first radio technology and a second radio technology. In some scenarios, the access node may support both the first radio technology and the second radio technology and may schedule radio transmissions for both the first and the second radio technology. This may for example be the case if the access node combines functionalities of the eNB 110 and the NR access node 120 as illustrated in FIGS. 1 and 2.

At step 920, the access node receives control information. The access node may receive the control information from a node which is responsible for managing access of the radio device to the wireless communication network and/or mobility of the radio device in the wireless communication network. Examples of such node are the above-mentioned MME 150 and AMF 160.

The control information may depend on subscription data associated with the radio device. In other words, the control information may be subscriber-specific. In some scenarios, the control information may further depend on a location of the radio device within a coverage area of the wireless communication network.

At step 930, the access node controls a restriction of scheduling of radio transmissions of the radio device for one of the first radio technology and the second radio technology. This is accomplished depending on the control information received at step 920. If the access node support only one of the first radio technology and the second radio technology and the restriction applies to the other one of the first radio technology and the second radio technology, the access node may control the restriction of scheduling by sending further control information to another access node which is responsible for the scheduling of radio transmissions for this other one of the first radio technology and the second radio technology. Otherwise, the access node may apply the restriction by the scheduling performed by the access node itself.

The restriction of scheduling may block scheduling of radio transmissions with user plane data. In some scenarios, the restriction of scheduling may block scheduling of radio transmissions with user plane data, while admitting scheduling of radio transmissions with control plane data, such as control plane data relating to mobility management of the radio device or control plane data relating to registration of the radio device in the wireless communication network.

In response to the control information indicating that one of the first radio technology and the second radio technology is not allowed, the access node may activate the restriction of scheduling for this radio technology. In response to the control information indicating that said one of the first radio technology and the second radio technology is allowed, the access node may deactivate (or not activate) the restriction of scheduling for this radio technology.

Figure 10:
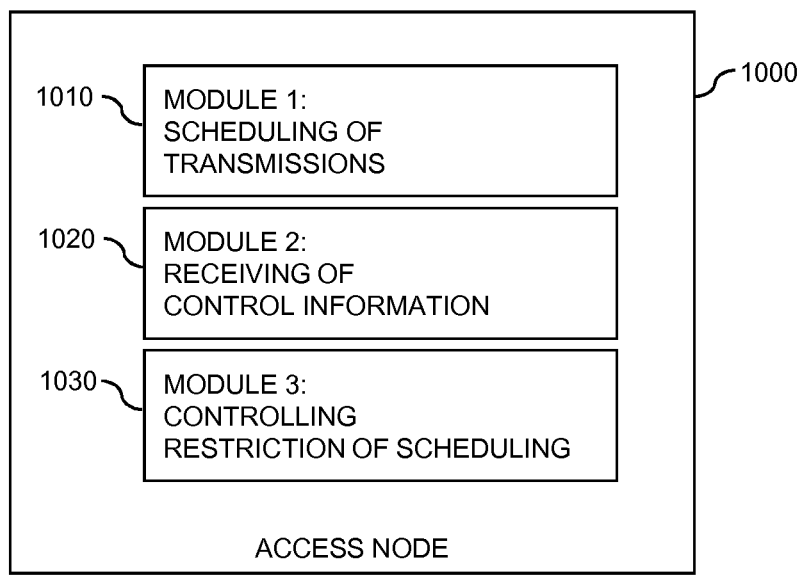
FIG. 10 shows a block diagram for illustrating functionalities of a network node according to an embodiment of the invention.

FIG. 10 shows a block diagram for illustrating functionalities of an access node 1000 which operates according to the method of FIG. 9. As illustrated, the access node 1000 may be provided with a module 1010 configured to schedule radio transmissions, such as explained in connection with step 910. Further, the access node 1000 may be provided with a module 1020 configured to receive control information, such as explained in connection with step 920. Further, the network node 1000 may be provided with a module 1030 configured to control a restriction of scheduling, such as explained in connection with step 930.

It is noted that the access node 1000 may include further modules for implementing other functionalities, such as known functionalities of an eNB or NR access node. Further, it is noted that the modules of the access node 1000 do not necessarily represent a hardware structure of the access node 1000, but may also correspond to functional elements, e.g., implemented by hardware, software, or a combination thereof.

Further, it is noted that the illustrated concepts could also be implemented in a system including a node operating according to the method of FIG. 7 and an access node operating according to the method of FIG. 9. In this case, the afore-mentioned node could determine the control information in the control procedures of step 730 and provide the control information to the access node, which could then apply the restriction of scheduling.

Figure 11:
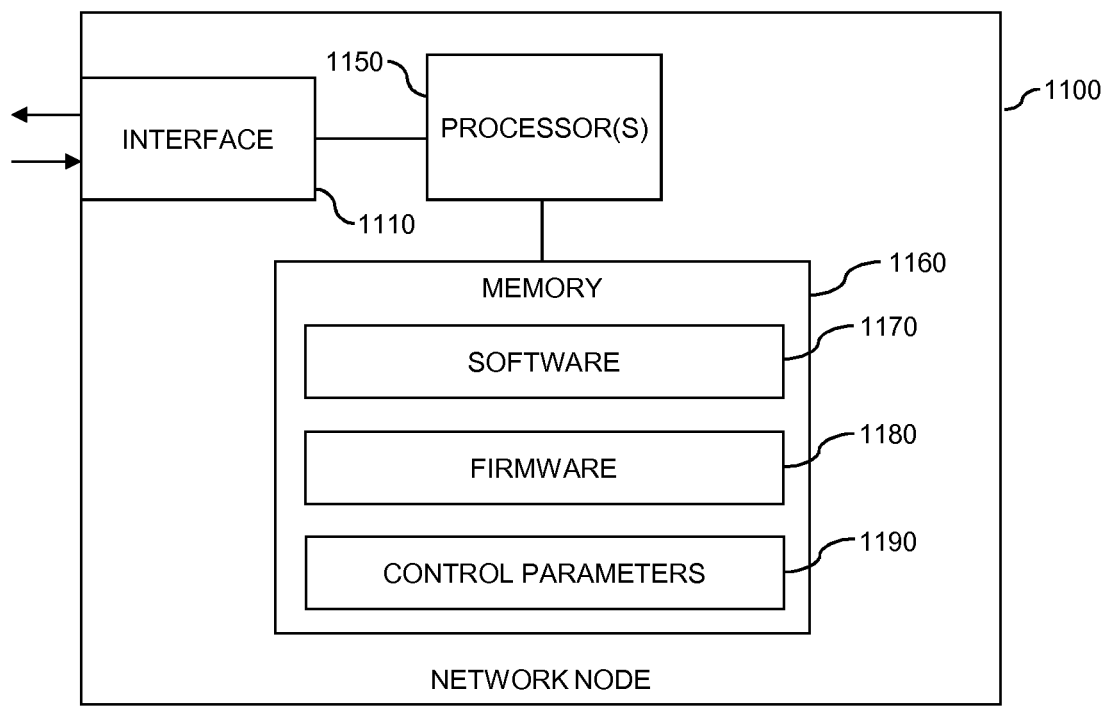
FIG. 11 schematically illustrates structures of a network node according to an embodiment of the invention.

FIG. 11 illustrates a processor-based implementation of a network node 1100 which may be used for implementing the above-described concepts. The network node 1100 may for example correspond to a node which is responsible for managing access or mobility in a wireless communication network, such as the above-mentioned MME 150 or AMF 160.

As illustrated, the network node 1100 includes an interface 1110. The interface 1110 may be used for receiving subscription data, e.g., from a subscriber database such as the above-mentioned HSS 180 or UDM 190. Further, the interface 1110 may be used for sending control information, e.g., to an access node, such as the above-mentioned access node 110 or 120. It is noted that in some scenarios also separate interfaces could be used for the receiving subscription data and the sending of control information.

Further, the network node 1100 may include one or more processors 1150 coupled to the interface 1110 and a memory 1160 coupled to the processor(s) 1150. By way of example, the interface 1110, the processor(s) 1150, and the memory 1160 could be coupled by one or more internal bus systems of the network node 1100. The memory 1160 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a network node, such as explained in connection with FIG. 7.

It is to be understood that the structures as illustrated in FIG. 11 are merely schematic and that the network node 1100 may actually include further components which, for the sake of clarity, have not been illustrated, e.g., further interfaces or processors. Also, it is to be understood that the memory 1160 may include further program code for implementing known functionalities of a network node, e.g., known functionalities of an MME or AMF. According to some embodiments, also a computer program may be provided for implementing functionalities of the network node 1100, e.g., in the form of a physical medium storing the program code and/or other data to be stored in the memory 1160 or by making the program code available for download or by streaming.

Figure 12:
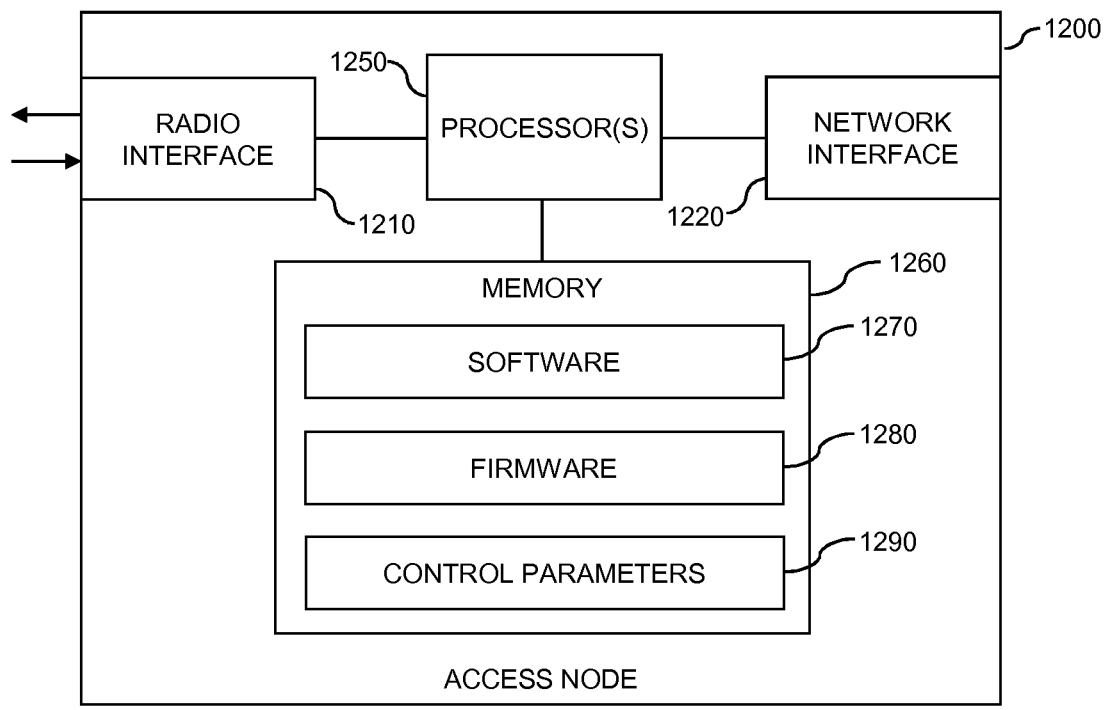
FIG. 12 schematically illustrates structures of an access node according to an embodiment of the invention.

FIG. 12 illustrates a processor-based implementation of an access node 1200 which may be used for implementing the above-described concepts. The access node 1200 may for example correspond to the above-mentioned eNB 110 or NR access node 120.

As illustrated, the access node 1200 includes a radio interface 1210. The radio interface 1210 for providing connectivity of radio devices, such as the above-mentioned UE 10, to a wireless communication network. The radio interface 1210 may support multiple radio technologies, such as the above-mentioned LTE RAT and NR RAT. However, in some scenarios the radio interface could also support only one radio technology. As further illustrated, the access node 1200 includes a network interface 1220. The network interface 1220 may be used for receiving control information, e.g., from a node which is responsible for managing access to the wireless communication network and/or mobility in the wireless communication network, such as the above-mentioned MME 150 or AMF 160.

Further, the access node 1200 may include one or more processors 1250 coupled to the interfaces 1210, 1220 and a memory 1260 coupled to the processor(s) 1250. By way of example, the interfaces 1210, 1220, the processor(s) 1250, and the memory 1260 could be coupled by one or more internal bus systems of the access node 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of an access node, such as explained in connection with FIG. 9.

It is to be understood that the structures as illustrated in FIG. 12 are merely schematic and that the access node 1200 may actually include further components which, for the sake of clarity, have not been illustrated, e.g., further interfaces or processors. Also, it is to be understood that the memory 1260 may include further program code for implementing known functionalities of an access node, e.g., known functionalities of an eNB or NR access node. According to some embodiments, also a computer program may be provided for implementing functionalities of the access node 1200, e.g., in the form of a physical medium storing the program code and/or other data to be stored in the memory 1260 or by making the program code available for download or by streaming.

As can be seen, the concepts as described above may be used for efficiently controlling the utilization of connectivity based on parallel usage of two or more radio technologies. Specifically, the utilization of such features may be controlled in a subscription-specific manner. Further, the utilization of a certain radio technology may be restricted, without having to reject access attempts for this radio technology.

It is to be understood that the examples and embodiments as explained above are merely illustrative and susceptible to various modifications. For example, the illustrated concepts may be applied in connection with various kinds of radio technologies, without limitation to the above-mentioned example of the LTE RAT and NR RAT. Further, it is noted that various kinds of messages or protocols may be used for conveying information between the nodes. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method of controlling radio transmissions in a wireless communication network, the method comprising:
   a node of the wireless communication network controlling dual connectivity of a radio device to the wireless communication network, the dual connectivity being based on a first radio technology and a second radio technology;
   depending on subscription data associated with the radio device, the node controlling a restriction on scheduling of radio transmissions of the radio device for one of the first radio technology and the second radio technology;
   wherein the restriction blocks scheduling of radio transmissions with user plane data while admitting scheduling of radio transmissions with control plane data; and
   wherein the node controls the restriction by sending control information to an access node which is responsible for the scheduling of radio transmissions of the radio device.

2. The method of claim 1, further comprising:
in response to the subscription data indicating that the one of the first radio technology and the second radio technology is not allowed, the node activating the restriction for this radio technology; and/or
in response to the subscription data indicating that the one of the first radio technology and the second radio technology is allowed, the node deactivating the restriction for this radio technology.

3. The method of claim 1, wherein the controlling of the restriction further depends on a location of the radio device within a coverage area of the wireless communication network.

4. The method of claim 1, wherein the node receives the subscription data from a subscriber database.

5. The method of claim 1:
wherein the node is responsible for managing access of the radio device to the wireless communication network and/or mobility of the radio device in the wireless communication network; and
wherein the control plane data relates to mobility management of the radio device and/or registration of the radio device in the wireless communication network.

6. A method of controlling radio transmissions in a wireless communication network, the method comprising:
for at least one of a first radio technology and a second radio technology, an access node of the wireless communication network scheduling radio transmissions of a radio device having dual connectivity based on the first radio technology and the second radio technology;
the access node receiving control information;
depending on the control information, the access node controlling a restriction on scheduling of radio transmissions of the radio device for one of the first radio technology and the second radio technology;
wherein the restriction blocks scheduling of radio transmissions with user plane data while admitting scheduling of radio transmissions with control plane data; and
wherein the access node receives the control information from a node which is responsible for managing access of the radio device to the wireless communication network and/or mobility of the radio device in the wireless communication network.

7. The method of claim 6, further comprising:
in response to the control information indicating that the one of the first radio technology and the second radio technology is not allowed, the access node activating the restriction for this radio technology; and/or
in response to the control information indicating that the one of the first radio technology and the second radio technology is allowed, the access node deactivating the restriction for this radio technology.

8. The method of claim 6:
wherein the control plane data relates to mobility management of the radio device and/or registration of the radio device in the wireless communication network.

9. The method of claim 6, wherein the control information depends on a location of the radio device within a coverage area of the wireless communication network.

10. A node for a wireless communication network, the node comprising:
processing circuitry;
memory containing instructions executable by the processing circuitry whereby the node is operative to:
control dual connectivity of a radio device to the wireless communication network, the dual connectivity being based on a first radio technology and a second radio technology;
depending on subscription data associated with the radio device, control a restriction on scheduling of radio transmissions of the radio device for one of the first radio technology and the second radio technology;
wherein the restriction blocks scheduling of radio transmissions with user plane data while admitting scheduling of radio transmissions with control plane data; and
wherein the instructions are such that the node is operative to control the restriction by sending control information to an access node which is responsible for the scheduling of radio transmissions of the radio device.

11. The node of claim 10, wherein the instructions are such that the node is operative to:
in response to the subscription data indicating that the one of the first radio technology and the second radio technology is not allowed, activate the restriction for this radio technology; and/or
in response to the subscription data indicating that the one of the first radio technology and the second radio technology is allowed, deactivate the restriction for this radio technology.

12. The node of claim 10, wherein the instructions are such that the node is operative to control the restriction further depending on a location of the radio device within a coverage area of the wireless communication network.

13. The node of claim 10, wherein the instructions are such that the node is operative to receive the subscription data from a subscriber database.

14. The node of claim 10:
wherein the instructions are such that the node is operative to manage access of the radio device to the wireless communication network and/or mobility of the radio device in the wireless communication network; and
wherein the control plane data relates to mobility management of the radio device and/or registration of the radio device in the wireless communication network.

15. An access node for a wireless communication network, the access node comprising:
processing circuitry;
memory containing instructions executable by the processing circuitry whereby the access node is operative to:
for at least one of a first radio technology and a second radio technology, schedule radio transmissions of a radio device having dual connectivity based on the first radio technology and the second radio technology;
receive control information;
depending on the control information, control a restriction on scheduling of radio transmissions of the radio device for one of the first radio technology and the second radio technology;
wherein the restriction blocks scheduling of radio transmissions with user plane data while admitting scheduling of radio transmissions with control plane data; and
wherein the instructions are such that the access node is operative to receive the control information from a node which is responsible for managing access of the radio device to the wireless communication network and/or mobility of the radio device in the wireless communication network.

16. The access node of claim 15, wherein the instructions are such that the access node is operative to:
- in response to the control information indicating that the one of the first radio technology and the second radio technology is not allowed, activate the restriction for this radio technology; and/or
- in response to the control information indicating that the one of the first radio technology and the second radio technology is allowed, deactivate the restriction for this radio technology.

17. The access node of claim 15:
- wherein the control plane data relates to mobility management of the radio device and/or registration of the radio device in the wireless communication network.

18. The access node of claim 15, wherein the control information further depends on a location of the radio device within a coverage area of the wireless communication network.

19. A non-transitory computer readable recording medium storing a computer program product for controlling radio transmissions in a wireless communication network, the computer program product comprising software instructions which, when run on processing circuitry of a node of the wireless communication network, causes the node to:
- control dual connectivity of a radio device to the wireless communication network, the dual connectivity being based on a first radio technology and a second radio technology;
- control, depending on subscription data associated with the radio device, a restriction on scheduling of radio transmissions of the radio device for one of the first radio technology and the second radio technology;
- wherein the restriction blocks scheduling of radio transmissions with user plane data while admitting scheduling of radio transmissions with control plane data; and
- wherein the node controls the restriction by sending control information to an access node which is responsible for the scheduling of radio transmissions of the radio device.

20. A non-transitory computer readable recording medium storing a computer program product for controlling radio transmissions in a wireless communication network, the computer program product comprising software instructions which, when run on processing circuitry of an access node of the wireless communication network, causes the access node to:
- schedule, for at least one of a first radio technology and a second radio technology, radio transmissions of a radio device having dual connectivity based on the first radio technology and the second radio technology;
- receive control information;
- control, depending on the control information, a restriction on scheduling of radio transmissions of the radio device for one of the first radio technology and the second radio technology;
- wherein the restriction blocks scheduling of radio transmissions with user plane data while admitting scheduling of radio transmissions with control plane data; and
- wherein the access node receives the control information from a node which is responsible for managing access of the radio device to the wireless communication network and/or mobility of the radio device in the wireless communication network.

* * * * *

UNITED STATES PATENT AND TRADEMARK OFFICE
CERTIFICATE OF CORRECTION

PATENT NO. : 10,917,897 B2
APPLICATION NO. : 16/348526
DATED : February 9, 2021
INVENTOR(S) : Keller et al.

It is certified that error appears in the above-identified patent and that said Letters Patent is hereby corrected as shown below:

In the Specification

In Column 4, Line 55, delete "eNB 120" and insert -- eNB 110 --, therefor.

In Column 7, Line 61, delete "AMF 150." and insert -- AMF 160. --, therefor.

In Column 12, Line 46, delete "network node 1000" and insert -- access node 1000 --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*